(12) United States Patent
Takeuchi et al.

(10) Patent No.: US 7,005,815 B2
(45) Date of Patent: Feb. 28, 2006

(54) ELECTRIC ACTUATOR SYSTEM

(75) Inventors: Tokuhisa Takeuchi, Chita-gun (JP); Hiroshi Nakajima, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/892,432

(22) Filed: Jul. 15, 2004

(65) Prior Publication Data

US 2005/0012480 A1  Jan. 20, 2005

(30) Foreign Application Priority Data

Jul. 17, 2003  (JP) .............................. 2003-276071

(51) Int. Cl.
*H02P 1/00* (2006.01)
*H02P 1/22* (2006.01)
*H02P 1/40* (2006.01)
*H02P 3/00* (2006.01)
*H02P 3/20* (2006.01)
*H02P 7/00* (2006.01)
*H02P 5/00* (2006.01)

(52) U.S. Cl. ...................... 318/265; 318/286; 318/602; 318/661

(58) Field of Classification Search ................ 318/265, 318/59, 431, 464, 53, 54, 66, 62, 65, 430, 318/461, 463, 625
See application file for complete search history.

(56) References Cited

U.S. PATENT DOCUMENTS

| | | | | |
|---|---|---|---|---|
| 4,757,458 A | * | 7/1988 | Takemoto et al. .......... 700/254 |
| 4,918,360 A | * | 4/1990 | Tanaka et al. ................ 318/41 |
| 5,265,569 A | * | 11/1993 | Egashira et al. ............. 123/357 |
| 5,465,036 A | * | 11/1995 | Yasuhara ............... 318/568.11 |
| 5,781,817 A | * | 7/1998 | Nomura et al. .............. 396/508 |
| 5,847,531 A | * | 12/1998 | Hoffsommer et al. ........ 318/696 |
| 5,939,853 A | * | 8/1999 | Masauji et al. ............. 318/685 |
| 6,014,075 A | * | 1/2000 | Fujimori et al. ............. 340/461 |
| 6,026,063 A | * | 2/2000 | Ohba et al. .............. 369/30.28 |
| 6,410,909 B1 | * | 6/2002 | Rudolph et al. ........ 250/231.13 |
| 6,465,974 B1 | * | 10/2002 | Watanabe .................... 318/254 |
| 6,501,239 B1 | * | 12/2002 | Ito et al. ......................... 318/34 |
| 6,538,740 B1 | * | 3/2003 | Shiraishi et al. ............. 356/401 |
| 6,657,335 B1 | * | 12/2003 | Totsuka .................... 310/68 B |
| 6,731,092 B1 | * | 5/2004 | Shimazaki .................. 318/685 |
| 6,747,432 B1 | * | 6/2004 | Yoshimura .................. 318/599 |
| 6,771,178 B1 | * | 8/2004 | Bruzy et al. ................. 340/648 |
| 6,798,085 B1 | * | 9/2004 | Matsui et al. ................ 307/112 |

(Continued)

FOREIGN PATENT DOCUMENTS

JP        11-342724        12/1999

(Continued)

*Primary Examiner*—Marlon T. Fletcher
*Assistant Examiner*—Renata McCloud
(74) *Attorney, Agent, or Firm*—Harness, Dickey & Pierce, PLC (57) ABSTRACT

The detection of a pulse signal in an initialization pattern is ensured regardless of the position where a DC motor is stopped. A CPU detects the pulse signal generated by the pulse generator and an angle of rotation of a rotating shaft, and controls an angle of rotation of a rotating shaft based on the detected angle of rotation. The pulse generator generates the pulse signal in the initialization pattern, which indicates the position of origin of the angle of rotation, in accordance with the rotation of the DC motor. If a determination means determines that it is impossible to detect the pulse signal in the initialization pattern when the DC motor is rotated in a first direction, the CPU rotates the DC motor in a second direction.

13 Claims, 10 Drawing Sheets

U.S. PATENT DOCUMENTS

| | | | |
|---|---|---|---|
| 6,798,164 B1 * | 9/2004 | Umehara et al. | 318/685 |
| 6,801,007 B1 * | 10/2004 | Takeuchi et al. | 318/479 |
| 6,827,141 B1 * | 12/2004 | Smith et al. | 165/202 |
| 2002/0014104 A1 * | 2/2002 | Komura et al. | 73/1.88 |
| 2003/0076069 A1 * | 4/2003 | Yamada et al. | 318/696 |
| 2004/0004457 A1 | 1/2004 | Takeuchi et al. | |
| 2004/0012357 A1 * | 1/2004 | Takeuchi et al. | 318/479 |
| 2004/0124797 A1 | 7/2004 | Takeuchi et al. | |

FOREIGN PATENT DOCUMENTS

| | | |
|---|---|---|
| JP | 2000358396 A | * 12/2000 |
| JP | 2002354885 A | * 12/2002 |

* cited by examiner

ELECTRIC ACTUATOR SYSTEM

CROSS REFERENCE TO RELATED APPLICATION

This application is based upon, claims the benefit of priority of, and incorporates by reference Japanese Patent Application No. 2003-276071 filed Jul. 17, 2003.

BACKGROUND OF THE INVENTION

1. Field of the Invention

The teachings of the present invention relates to an electric actuator system for driving a movable member of an air conditioning system for vehicle such as an air mix door and an air-outlet mode switching door.

2. Description of the Related Art

Generally, a conventional electric actuator system is known that rotates an electric actuator (for example, a DC motor) to a limit, where the rotation is restricted by mechanical regulation means such as a stopper, and then stores the rotation limit point to control an angle of rotation of a rotating shaft. Hereinafter, the operation of rotating the electric actuator to the position of the origin and then storing the rotation of the electric actuator to the position of the origin is referred to as "origin position setting."

In this electric actuator system, a lever is secured to the rotating shaft. When the lever strikes against the stopper to operate the electric actuator to the point of the limit of rotation, the stopper bends. It was found that the angle of rotation cannot be accurately controlled because a variation occurs in the position of the origin as a result of the bend.

Therefore, the inventors of the present invention have examined the use of a pulse generator instead of the mechanical regulation means, such as a stopper, in order to detect the position of the origin. The pulse generator generates a pulse signal in an initialization pattern that indicates the position of the origin when a DC motor functioning as the electric actuator rotates to the point of the limit of rotation.

Hereinafter, the pulse generator will be described with reference to FIGS. 12 and 13. A pulse pattern plate 153, which rotates cooperatively with an output shaft 127 with the rotation of a DC motor, is used. The pulse pattern plate 153 is provided with first and second pulse patterns 151, 152, and a common pattern 154.

Figure 12:
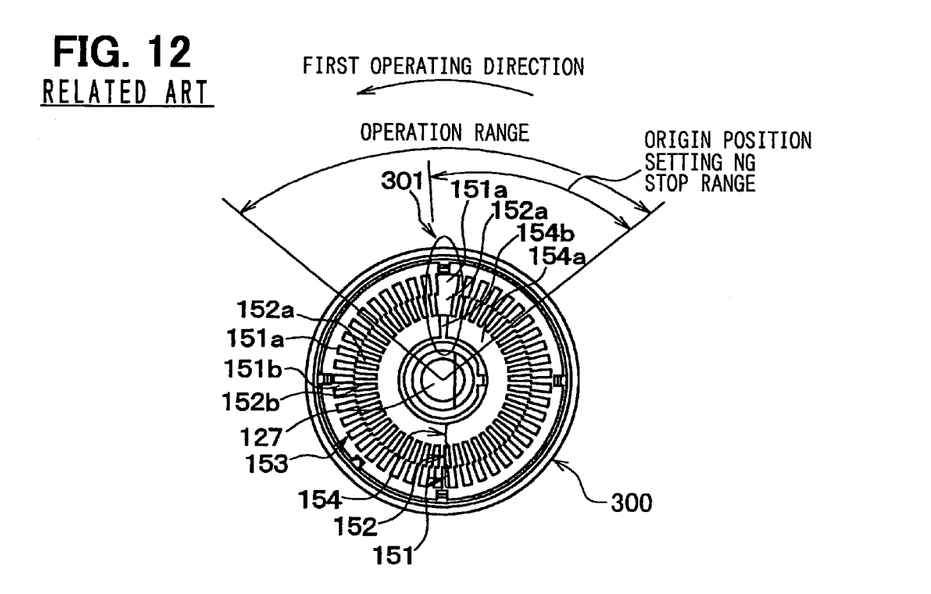
FIG. 12 is a diagram of a pulse pattern plate.

As shown in FIG. 12, the first pulse pattern 151 is composed of a conductive part 151a and a non-conductive part 151b, which are alternately arranged in a circumferential direction. The second pulse pattern 152 is composed of a conductive part 152a and a non-conductive part 152b, which are alternately arranged in a circumferential direction. The common pattern 154 is composed of conductive parts 154a and a non-conductive part 154b, which are arranged in a circumferential direction.

Figure 13:
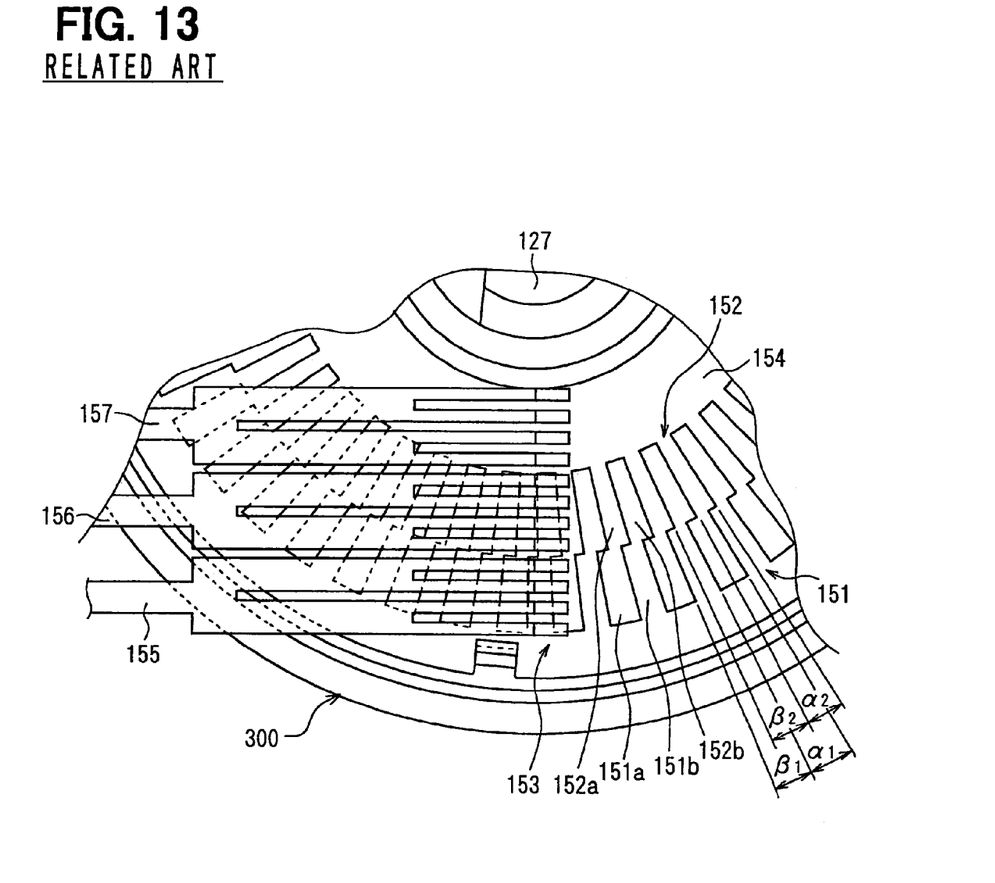
FIG. 13 is an enlarged partial view of the pulse pattern plate.

As shown in FIG. 13, in a circular rotation detection area 300 of the pulse pattern plate 153, an angle of circumference α1 of the conductive part 151a is set equal to an angle of circumference β1 of the non-conductive part 151b, whereas an angle of circumference α2 of the conductive part 152a is set equal to an angle of circumference β2 of the non-conductive part 152b. Moreover, a phase of the first pulse pattern 151 is shifted from that of the second pulse pattern 152 by about a half of each of the angle of circumference α1 and α2 (=each of the angles of circumference β1 and β2). The common pattern 154 in the area 300 is composed solely of the conductive part 154a.

The rotation detection area 300 as described above is used to generate a pattern of a pulse signal used for detecting an angle of rotation (hereinafter, referred to as an angle detection pattern).

As shown in FIG. 13, in an area other than the area 300 of the pulse pattern plate 153, that is, in an initialization area 301, the first and second pulse patterns 151 and 152 are composed solely of the conductive parts 151a and 152a, respectively. In this area, the common pattern 154 is formed so that the non-conductive part 154b is interposed between the conductive parts 154a in a circumferential direction.

The initialization area 301 as described above is used to generate a pulse signal pattern that indicates the position of the origin (hereinafter, referred to as an initialization pattern). In the first and second pulse patterns 151 and 152 and the common pattern 154, the respective conductive parts are electrically connected with each other. Furthermore, a first contact brush 155 and a second contact brush 156 (electric contacts), each being made of a copper conductive material, are used so as to be connected to a positive electrode (+) of a battery. A third contact brush 157 made of a copper conductive material is used so as to be connected to a negative electrode (−) of the battery. In this case, the first to third contact brushes 155 to 157 are arranged so that the first contact brush 155 is in contact with the first pulse pattern 151, the second contact brush 156 is in contact with the second pulse pattern 152, and the third contact brush 157 is in contact with the common pattern 154.

Next, an electric control circuit 200 for detecting a pulse generated-from the first and second pulse patterns 151 and 152 and the common pattern 154 will be described with reference to FIG. 14. First, a DC motor (M) rotates to cause the rotation of the output shaft 127 (the pulse pattern plate 153). When the first to third contact brushes 155 to 157 are in contact with the rotation detection area 300, the third contact brush 157 is in contact with the conductive part 154a.

In this condition, a conducting (ON) state and a non-conducting (OFF) state alternately occur in a periodic manner. In the conducting state, the first and second contact brushes 155 and 156 on the positive electrode side (+) are in contact with the conductive parts 151a and 152a, respectively. On the other hand, in the non-conducing state, the first and second contact brushes 155 and 156 are in contact with the non-conductive parts 151b and 152b, respectively. Thus, since a pulse signal is generated in the first and second contact brushes 155 and 156 each time the DC motor 110 rotates at a predetermined angle, the CPU 240 counts the pulse signals through a pulse signal detection circuit 220 to enable the detection of an angle of rotation of the output shaft 127.

Furthermore, when the DC motor 110 rotates to cause the rotation of the output shaft 127 (the pulse pattern plate 153) so that the first to third contact brushes 155 to 157 are brought into contact with the initialization area 301, the conducting (ON) state, where the first and second contact brushes 155 and 156 are respectively in contact with the conductive parts 151a and 152a, is maintained. Meanwhile, the third contact brush 157 and the common pattern 154 transit from the conductive (ON) state where the third contact brush 157 and the conductive part 154a are in contact with each other, through the non-conductive state (OFF) where the third contact brush 157 and the non-conductive part 154b are in contact with each other, again to the conductive (ON) state where the third contact brush 157 and the conductive part 154a are in contact with each other (the conductive part→the non-conductive part→the conductive part).

Therefore, in the first and second contact brushes 155 and 156, two-phase pulse signals (A-phase and B-phase) in the initialization pattern are generated in accordance with the angular rotation of the DC motor 110 as follows. Incidentally, switching means 158c in FIG. 14 is composed of the brush 157, the conductive part 154a, and the non-conductive part 154b. In the same manner, switching means 158a is composed of the brush 155, the conductive part 151a and the non-conductive part 151b, whereas switching means 158b is composed of the brush 156, the conductive part 152a, and the non-conductive part 152b.

More specifically, when the first to third contact brushes 155 to 157 are in contact with the initialization area 301, the conducting (ON) state where the first and second contact brushes 155 and 156 on the positive electrode side are in contact with the conductive parts 151a and 152a, is maintained (low-level signals "00" are maintained). Meanwhile, the third contact brush 157 on the negative electrode side and the common pattern 154 transit from the conductive (ON) state (low-level signals "00") where the third contact brush 157 and the conductive part 154a are in contact with each other, through the non-conductive (OFF) state (the high-level signals "11") where the third contact brush 157 and the non-conductive part 154b are in contact with each other, again to the conductive (ON) state (the low-level signals "00") where the third contact brush 157 and the conductive part 154a are in contact with each other (the conductive part→the non-conductive part→the conductive part).

More specifically, the initialization pattern is not such that the respective amplitudes of the two-phase pulse signals are alternately switched but such that the amplitudes of the two-phase pulse signals are simultaneously switched from the low-level signal ("00") to the high-level signal ("11") and simultaneously switched from the high-level signal ("11") to the low-level signal ("00"). Herein, "0" indicates a low-level signal and "1" indicates a high-level signal.

As described above, in contrast to the angle detection pattern used for detecting the angular rotation of the DC motor 110, the initialization pattern is such that the amplitudes of the two-phase pulse signals simultaneously change.

Then, when the CPU 240 detects the two-phase pulse signals in the initialization pattern through the pulse signal detection circuit 220, the power supply to the DC motor 110 is stopped by a motor driving circuit 210. This electrically regulates the rotation of the DC motor 110 and the position where the two-phase pulse signals in the initialization pattern are detected as the position of the origin is stored.

As is apparent from the above description, the pulse generator 158 including the switching means 158a to 158c for generating a pulse signal by the first to third contact brushes 155 to 157 and the pulse pattern plate 153 each time the output shaft 127 is rotated at a predetermined angle is configured.

Herein, as shown in FIG. 12, the present inventors have examined the cases where an operation range in the pulse pattern plate 153 in which the angle of rotation is controlled (that is, a control range of the angle of rotation) is formed to be in a horizontal, approximately symmetric, fan-like shape including the initialization area 301 as a center. Further, they have also examined that the angle of rotation is controlled by rotating the pulse pattern plate 153 only in a first operating direction at the initialization. Then, it is found that the following inconvenience occurs.

More specifically, suppose a case in which the first to third contact brushes 155 to 157 stop in a contact state in the initialization area 301 and an area on the right of the initialization area 301 within the operation range of the pulse pattern plate 153 in FIG. 12. In this case, an area where the origin position setting is impossible (hereinafter, referred to as an origin position setting NG stop range) is generated. For example, once the first to third contact brushes 155 to 157 are stopped in contact with the initialization area 301, the first to third contact brushes 155 to 157 never reach the initialization area 301 unless the pulse pattern plate 153 is rotated at 360 degrees even if the pulse pattern plate 153 is rotated in the first operating direction in order to control the angle of rotation.

Similarly, once the first to third contact brushes 155 to 157 stop in the area within the operation range on the right of the initialization area 301 in FIG. 12, the first to third contact brushes 155 to 157 never reach the initialization area 301 unless the pulse pattern plate 153 is rotated at 360 degrees. This is such even if the pulse pattern plate 153 is rotated in the first operating direction in order to control the angle of rotation.

In this case, if a movable member (for example, an air mix door, an air-outlet mode switching door and the like) is to be driven by the rotation of the output shaft 127, it is considered that it is impossible to rotate the pulse pattern plate 153 360 degrees in some cases depending on the structure of a link mechanism for linking the output shaft 127 and the movable member with each other. On the other hand, even if the pulse pattern plate 153 is formed to be rotatable 360 degrees in view of the structure of the link mechanism, the movable member is not necessarily rotated at 360 degrees even if the pulse pattern plate 153 is rotated at 360 degrees.

For example, in the case where the movable member is formed to rotate at 90 degrees when the pulse pattern plate 153 is rotated at 360 degrees, two-phase pulse signals in the initialization pattern are generated when the pulse pattern plate 153 is rotated at 360 degrees. However, the movable member does not reach the normal position of the origin.

As described above, when the first to third contact brushes 155 to 157 stop within the origin position setting NG stop range in a contact state, a pulse signal in the initialization pattern may not be generated or the movable member may not reach the normal position of the origin to prevent the detection of the position of the origin. As a result, there is a possibility that the origin position setting cannot be completed.

SUMMARY OF THE INVENTION

In view of the above problem, the teachings of the present invention provide an electric actuator system ensuring the detection of a position of an origin regardless of the position where an electric motor is stopped.

According to a first aspect of the present teachings, an electric actuator system rotates an electric actuator to a position of an origin of an angle of rotation so as to perform origin position setting for storing the origin position. The electric actuator system has an electric motor (110), a pulse generator section (158) for generating a pulse signal in accordance with the rotation of the electric motor and a pulse signal in an initialization pattern that indicates the position of the origin. A control means detects an angle of rotation of a rotating shaft based on the pulse signal generated from the pulse generator section. The control means also controls the angle of rotation of the rotating shaft at least over a control range of the angle of rotation based on the detected angle of rotation. A determination means (step S110) determines whether it is impossible to detect the pulse signal in the initialization pattern or not when the electric motor is rotated in a first direction. A reversing means (step S120) rotates the electric motor in a second direction so as to attempt detection of the initialization pattern when the determination means determines that it is impossible to detect the pulse signal in the initialization pattern.

With this configuration, if only the electric motor is rotated in the other direction by the reversing means, it is ensured that the pulse signal in the initialization pattern can be detected regardless of the position where the electric motor is stopped. As a result, it is ensured that the position of the origin can be detected regardless of the position where the electric motor is stopped.

According to a second aspect of the present teachings, the system may further have stopper parts (5a, 5b) for mechanically stopping the electric motor. The determination means (step S110) may determine whether the electric motor is stopped by the stopper parts based on the pulse signal generated from the pulse generator so as to determine whether it is impossible to detect the pulse signal in the initialization pattern.

According to a third aspect of the present teachings, the stopper parts may be arranged so as to stop the electric motor at a position out of the control range of the angle of rotation. According to a fourth aspect of the present teachings, the stopper parts may be arranged on one side and another side so as to stop the electric motor at positions on both sides of the control range of the angle of rotation.

Even when it is determined that it is impossible to detect the pulse signal in the initialization pattern and then the electric motor is rotated in the other direction by one of the stopper parts, it may be impossible to detect the pulse signal in the initialization pattern for some reasons (for example, the presence of a foreign substance or the like). In this case, according to the present teachings the pulse signal in the initialization pattern can be detected merely by stopping the electric motor with the other stopper part so as to reversely rotate the electric motor. More specifically, if only the electric motor is stopped by the other stopper part and then is reversely rotated, it is possible to detect the position of the origin.

According to a fifth aspect of the present teachings, the determination means may determine that it is impossible to detect the pulse signal in the initialization pattern when the pulse signal in the initialization pattern cannot be detected even after the electric motor is rotated in one direction for a predetermined period of time. In this case, even without providing any stopper portions, it is possible to determine that the detection of the pulse signal in the initialization pattern is impossible.

According to a sixth aspect of the present teachings, the pulse generator section (158) may include a pulse pattern plate (153) that rotates cooperatively with the rotation of the electric motor (110). The pulse pattern plate (153) has a first pulse pattern (151), a second pulse pattern (152), and a common pattern (154). Furthermore, the first pulse pattern (151) may have a conductive part (151a) and a non-conductive part (151b) alternately arranged in a circumferential direction. The second pulse pattern (152) has a conductive part (152a) and a non-conductive part (152b) alternately arranged in the circumferential direction. The common pattern (154) has a conductive part (154a) and a non-conductive part (154b) arranged in the circumferential direction, the plurality of conductive parts being electrically connected to each other. The electric actuator system may further include a first contact brush (155) and a second contact brush (156) connected to one electrode side of a power source, and a third contact brush (157) connected to the other electrode side to be formed in contact with the common pattern (154).

According to a seventh aspect of the present teachings, the initialization pattern is not such that amplitudes of two-phase pulse signals are alternately changed but such that the two-phase pulse signals are simultaneously switched from a first level signal "00" to a second level signal "11" and simultaneously switched from the second level signal "11" to the first level signal "00."

According to an eighth aspect of the present teachings, in an initialization pattern generation state where each of the brushes is in contact with an initialization area (301) being at the position of the origin, the third contact brush (157) and the conductive part (154a) of the common pattern (154) transit. The transit occurs from a conducting state where the third contact brush (157) and the conductive part (154a) of the common pattern (154) are in contact with each other, through a non-conducting state where the third contact brush (157) and the non-conductive part (154b) of the common pattern (154) are in contact with each other, to the conducting state again where the third contact brush (157) and the conductive part (154a) are in contact with each other. This is accomplished while keeping a conducting state where the first and second contact brushes (155 and 156) and the conductive parts (151a and 152a) of the first and second pulse patterns (151 and 152) are in contact with each other, respectively; and in the state where each of the brushes is in contact with the initialization area.

The system may provide the initialization pattern in which the third contact brush (157) on the other electrode side and the common pattern (154) transit from a first level signal "00" at which the third contact brush (157) and the conductive part (154a) of the common pattern (154) are in contact with each other, through the second level signal "11," at which the third contact brush (157) and the non-conductive part (154b) of the common pattern (154) are in contact with each other. Then, transit occurs again to the first level signal "00" at which the third contact brush (157) and the conductive part (154a) are in contact with each other, while keeping the second level signal "11" at which the first and second contact brushes (155 and 156) on the one electrode side and the conductive parts (151a and 152a) of the first and second pulse patterns (151 and 152) are in contact with each other, respectively.

According to a ninth aspect of the present teachings, in the initialization area (301) and an area on a forward rotation side of the initialization area (301) within an operation range of the pulse pattern plate (153) based on a rotation range of the electric motor (110), if the first to third contact brushes (155, 156, and 157) stop in a contact state, an area where the origin position setting is impossible may be generated on the forward rotation side.

According to a tenth aspect of the present teachings, the electric motor (110) may be one for driving a movable member including a link mechanism by the rotation of an output shaft (127) of the electric motor (110).

According to an eleventh aspect of the present teachings, the movable member may comprise a door for controlling an air flow of an air conditioning system. According to a twelfth aspect of the present teachings, the determination means may determine that the electric motor is stopped by the stopper parts when an amplitude of the pulse signal is constant over a predetermined period of time.

According to a thirteenth aspect of the present teachings, if it is determined that it is impossible to detect the pulse signal in the initialization pattern, the electric motor may be reversed. If upon initiating turning or turning in the reverse direction, the electric motor is stopped by the stopper (5*a*) on the other side, the reversing means may again rotate the electric motor (110) in the original direction so as to attempt the detection of the pulse signal in the initialization pattern.

Further areas of applicability of the teachings of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The teachings of the present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
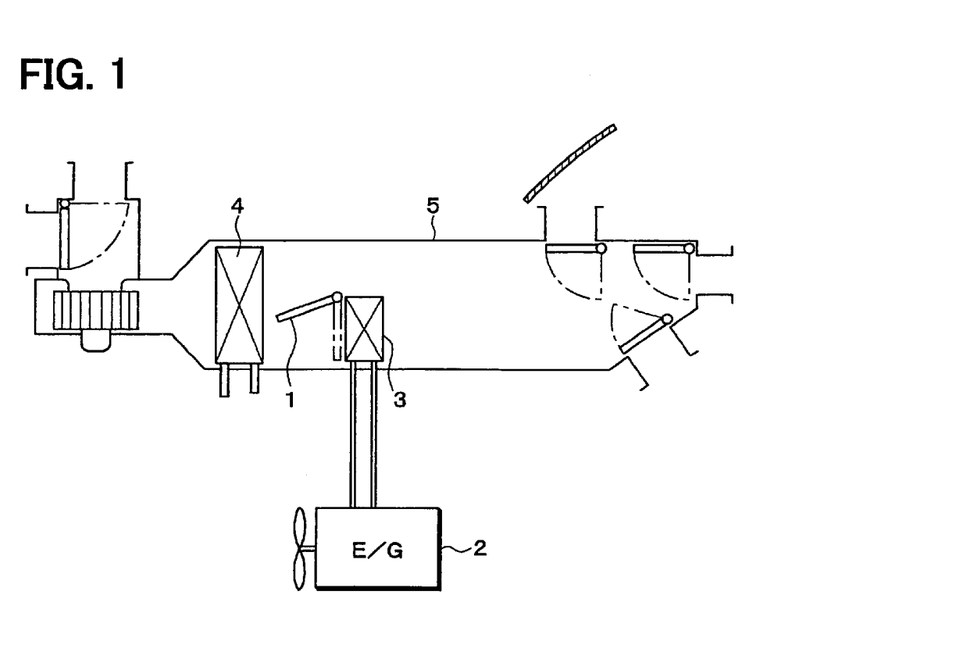
FIG. 1 is a schematic view of an air conditioning system for a vehicle.

FIG. 1 shows an embodiment of an air conditioning system for a vehicle, to which an electric actuator according to teachings of the present invention is applied. In this embodiment, an electric actuator is used as a driving device of an air mix door 1. The air mix door 1 regulates the amount of air flowing around a heater core 3 for heating air blown into a compartment. The heater core 3 uses engine cooling water from the engine 2, which acts as the heat source, to regulate the temperature of the air blown into the compartment.

Heat exchangers such as the heater core 3 and an evaporator 4, the air mix door 1, and the like are housed within an air conditioning system casing 5 made of a resin. The electric actuator is secured to the air conditioning system casing 5 by a fastening means such as a screw.

Figure 2A:
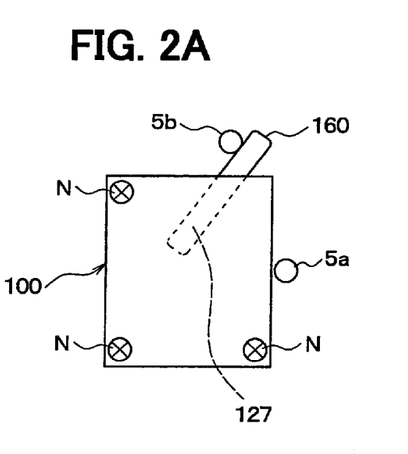
FIG. 2A is a front external view of an electric actuator according to a first embodiment of the present invention.
Figure 2B:
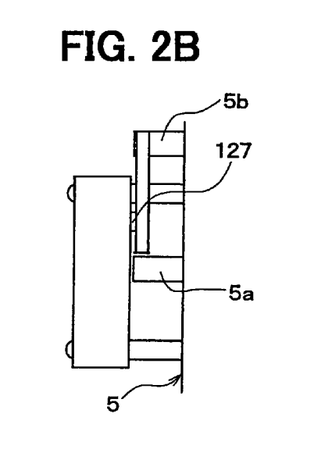
FIG. 2B is a side external view of an electric actuator according to the first embodiment of the present invention.
Figure 3:
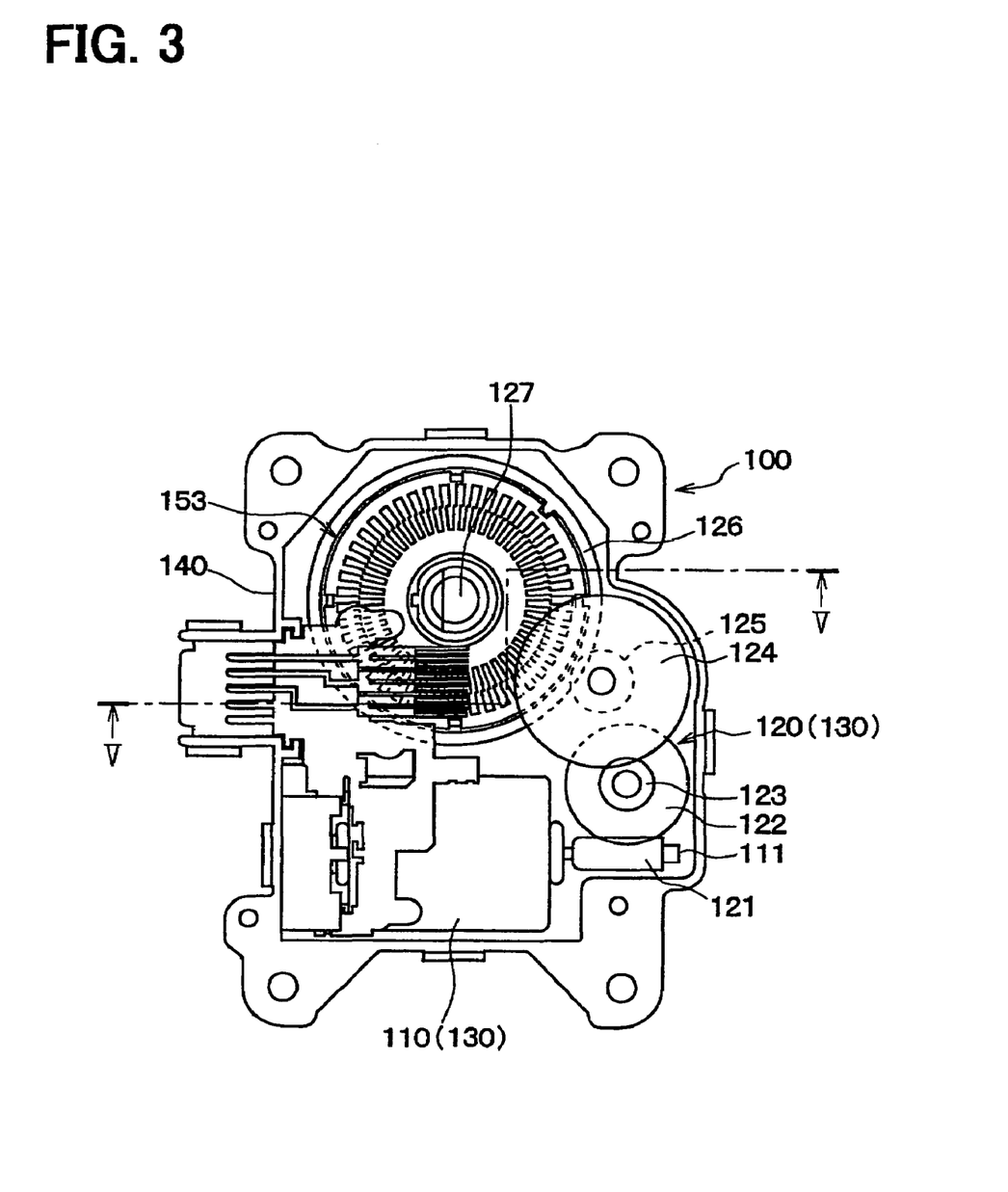
FIG. 3 is a schematic view of the electric actuator according to the first embodiment of the present invention.
Figure 4A:
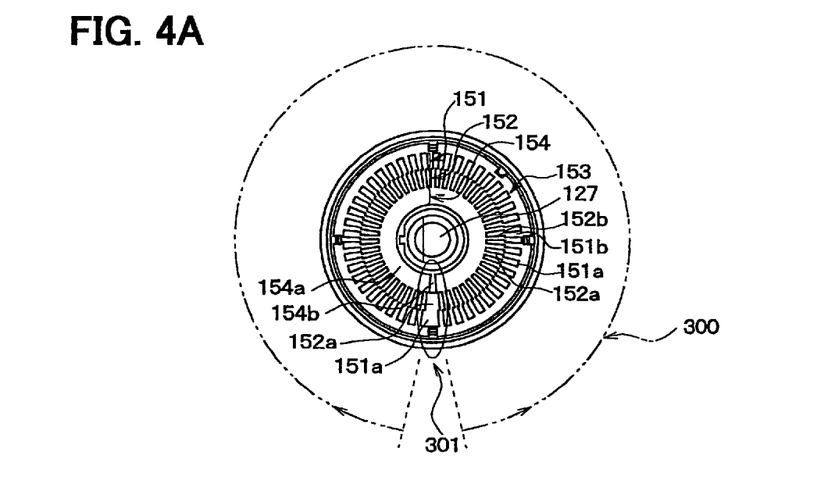
FIG. 4A is a front view of a pulse plate according to the first embodiment of the present invention.
Figure 4B:
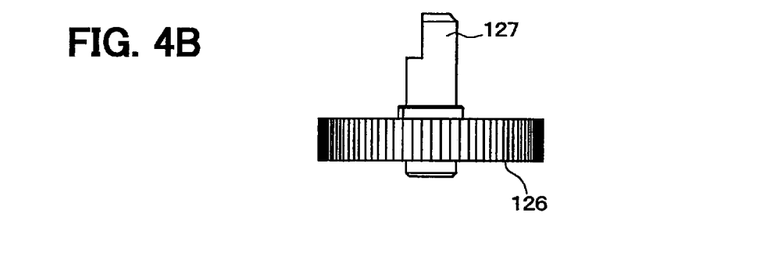
FIG. 4B is a side view of the pulse plate of FIG. 4A.
Figure 5:
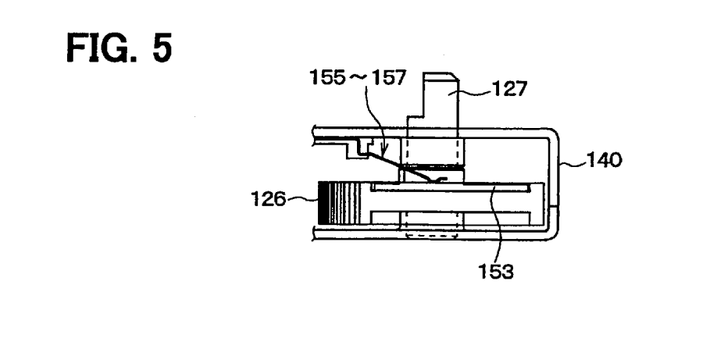
FIG. 5 is a cross-sectional view taken along the line V—V in FIG. 3.

The electric actuator according to this embodiment will now be described with reference to FIGS. 2A, 2B, and 3. FIGS. 2A and 2B are views of the external appearance of the electric actuator 100. FIG. 3 is a diagram of a structure of the electric actuator 100. In FIG. 3, a DC motor 110 receives electric power supplied from a vehicle battery (not shown) to cause rotation. A reducer mechanism 120 reduces a turning force input from the DC motor 110 so as to output the reduced turning force to the air mix door 1. Hereinafter, mechanism sections for rotary driving such as the DC motor 110 and the reducer mechanism 120 are collectively referred to as a driving section 130.

Herein, the reducer mechanism 120 includes a train of gears composed of a worm 121, a worm wheel 122, a plurality of spur gears 123 and 124, a final-stage gear 126, and an output shaft 127. The worm 121 is pressed into an output shaft 111 of the DC motor 110. The worm wheel 122 mates with the worm 121. The final-stage gear (output-side gear) 126, which is located on the output side, is provided with the output shaft 127.

A casing 140 houses the driving section 130 therein. Moreover, contact brushes (electric contacts) 155 to 157 described below are fixed to the casing 140. On the output side (the output shaft 127) of the reducer mechanism 120 from the input gear (the worm 121) directly driven by the DC motor 110, a pulse pattern plate 153 is provided as shown in FIGS. 3 to 5 and 13 (in particular, in FIG. 13). The pulse pattern plate 153 is identical with that described above.

On the other hand, on the casing 140 side, the first to third contact brushes (electric contacts) 155 to 157, each being made of a copper conductive material, is attached after integral molding of resin. The first to third contact brushes 155 to 157 are identical with those described above.

In this embodiment, each of the first to third contact brushes 155 to 157 and the pulse pattern plate 153 are in contact with each other at two or more positions (in this embodiment, at four positions). As a result, it is ensured that the first to third contact brushes 155 to 157 are electrically connected with the conductive parts 151*a*, 152*a*, and 154*a*, respectively.

As shown in FIG. 2, a link lever 160 for swinging the air mix door 1 is pressed into the output shaft 127 so as to be fixed thereto. A pair of stoppers 5*a*, 5*b* are provided for the air conditioning system casing 5.

Each of the stoppers 5*a*, 5*b* is formed in a projecting manner so as to stop the link lever 160 by colliding with it. The stoppers 5*a*, 5*b* are arranged so as to mechanically stop the DC motor 110 in an area other than an operation range in which an angle of rotation of the output shaft 127 is controlled. Therefore, the stoppers 5*a*, 5*b* are located on both sides of the operation range. Moreover, the stoppers 5*a*, 5*b* are used to determine whether it is impossible to detect a pulse signal in an initialization pattern or not, as described below.

The reference numeral N in FIG. 2 denotes a screw for attaching the casing 140 to the air conditioning system casing 5.

Figure 6:
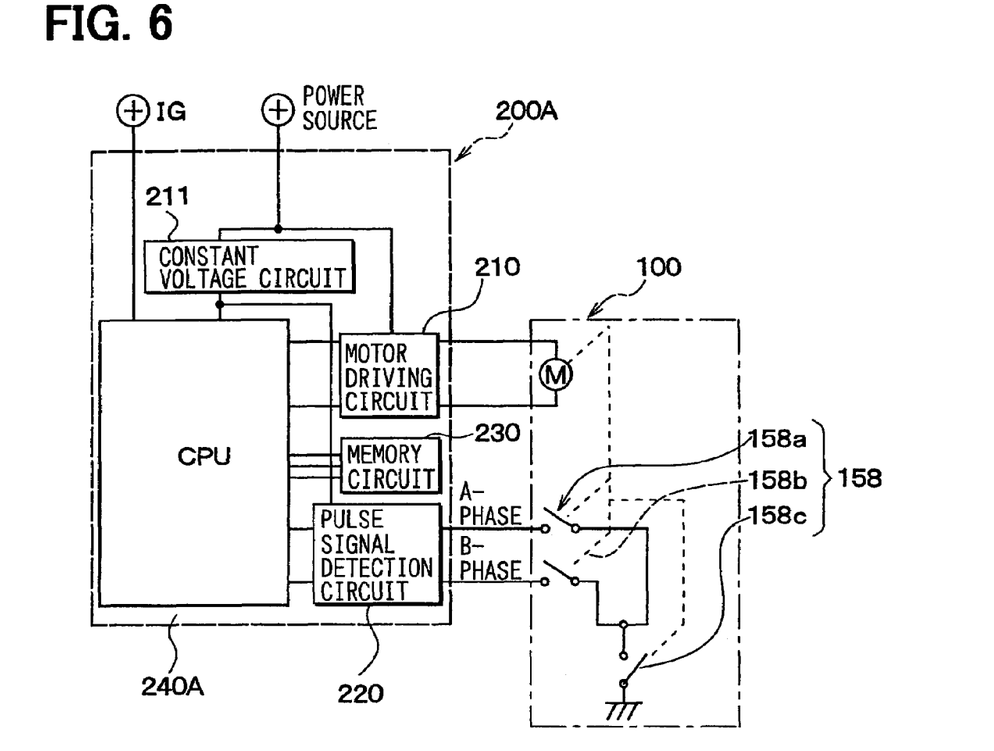
FIG. 6 is a schematic view of a control circuit of the electric actuator according to the first embodiment of the present invention.

Next, a schematic operation of the electric actuator 100 will be described with reference to FIGS. 6 and 7. FIG. 6 is a schematic view showing an electric control circuit 200A of the electric actuator 100. The electric control circuit 200A includes a motor driving circuit 210, a constant voltage circuit 211, a pulse signal detection circuit 220, a memory circuit 230, and a CPU (central processing unit) 240A. The motor driving circuit 210 is controlled by the CPU 240A so as to output a driving voltage to the DC motor (M) 110. The constant voltage circuit 211 receives electric power supplied from a battery so as to output a constant voltage to the circuits 210, 220, 230, 240A, and the like.

The pulse signal detection circuit 220 detects a pulse signal generated in the pulse pattern plate 153. The memory circuit 230 includes an EEPROM (a nonvolatile memory), a RAM, and the like so as to store data in accordance with the processing of the CPU 240A as well as to store a computer program.

The CPU 240A executes a control process for controlling an angle of rotation of the DC motor 110 based on a pulse signal input through the pulse signal detection circuit 220. Moreover, if it is determined that it is impossible to detect a pulse signal in an initialization pattern when the DC motor 110 is rotated in one direction, the CPU 240A rotates the DC motor 110 in a reverse direction so as to execute a process for detecting the pulse signal in the initialization pattern.

Figure 7:
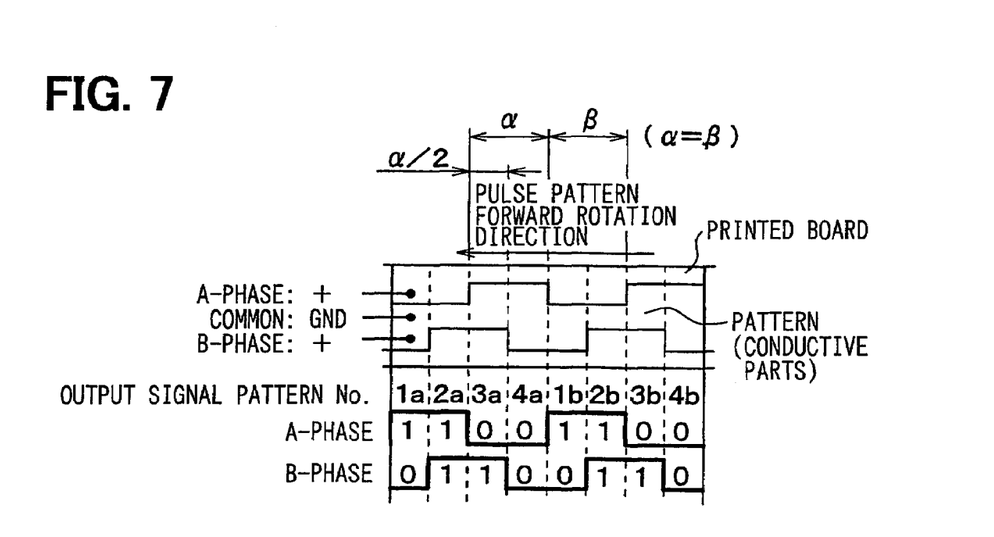
FIG. 7 is a diagram of a pulse signal of the electric actuator according to the first embodiment of the present invention.

Furthermore, when the DC motor 110 rotates to cause the rotation of the output shaft 127 (the pulse pattern plate 153), resulting in contact between the first to third contact brushes 155 to 157 and the rotation detection area 300, a pulse signal in an angle detection pattern is generated in the first and second contact brushes 155 and 156 each time the DC motor 110 is rotated at a predetermined angle as shown in FIG. 7, as in the case of the pulse pattern plate 153 described above. Then, the CPU 240A counts the pulse signals input through the pulse signal detection circuit 220, thereby enabling the detection of the angle of rotation of the output shaft 127.

Furthermore, when the DC motor 110 rotates to cause the rotation of the output shaft 127 (the pulse pattern plate 153), resulting in contact between the first to third contact brushes 155 to 157 and the initialization area 301, two-phase pulse signals similar to those in the initialization pattern described above are generated in the first and second contact brushes 155 and 156 in accordance with the angular rotation of the DC motor 110 ("00"→"11"→"00").

Then, when the CPU 240A detects the two-phase pulse signals in the initialization pattern through the pulse signal detection circuit 220, the power supply to the DC motor 110 is stopped by the motor driving circuit 210 so as to electrically regulate the rotation of the DC motor 110. With this regulation, the CPU 240A stores the position where the two-phase pulse signals in the initialization pattern are detected as the origin. Thereafter, except for the case where the battery comes off and the case where trouble is generated in the pulse signal, the angle of rotation of the DC motor 110 is controlled using the position shifted by one pulse, from the position of the origin, as an operation standard.

Hereinafter, in the case where the two-phase pulse signals in the initialization pattern are detected, the rotation of the DC motor 110 is electrically regulated. At the same time, the position where the two-phase pulse signals in the initialization pattern is detected is stored as the position of the origin. The action of setting the operation standard, shifted from the position of the origin, is referred to as "initial position setting."

Figure 14:
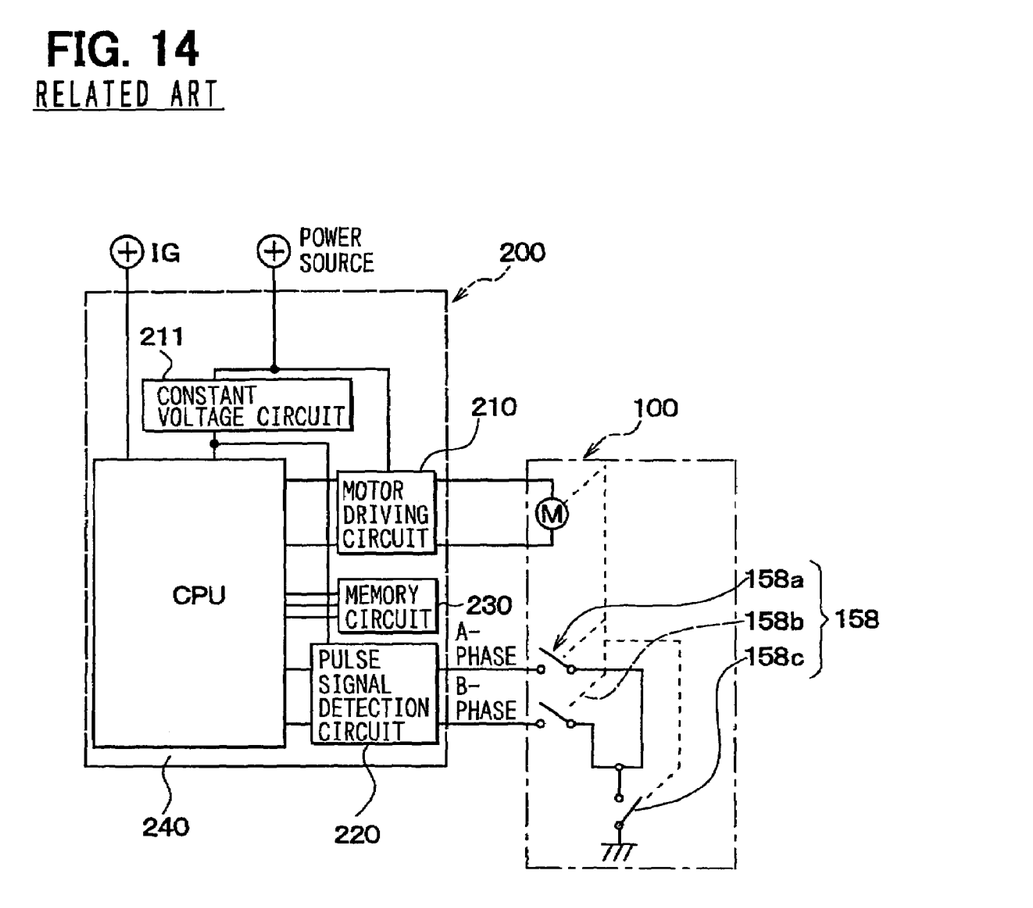
FIG. 14 is a schematic view of a control circuit of an electric actuator.

As is apparent from the above description, like the structure shown in FIG. 14, a pulse generator 158 (see FIG. 6) including switching means 158a to 158c for generating a pulse signal by the first to third contact brushes 155 to 157 and the pulse pattern plate 153 each time the output shaft 127 is rotated at a predetermined angle, is also configured in this embodiment. In this case, the switching means 158a is composed of the first contact brush 155 and a first pulse pattern 151, whereas the switching means 158b is composed of the second contact brush 156 and a second pulse pattern 152. The switching means 158a and 158b are arranged parallel to each other between the constant voltage circuit (the power circuit) and a ground, and are individually switched (ON/OFF) based on the rotation of the electric DC motor 110 so as to generate a pulse signal.

The switching means 158c is composed of the third contact brush 157 (one end of the contact brush 157 is electrically connected to the negative electrode side, that is, the ground) and the common pattern 154. The switching means 158c is switched between the switching means 158a and 158d and the ground, based on the rotation of the electric DC motor 110.

Since a phase of the first pulse pattern 151 is shifted from that of the second pulse pattern 152, two-phase signals are generated in the pulse generator 158. One pulse signal is generated by the first pulse pattern 151 and the first contact brush 155 (hereinafter, this pulse signal is referred to as an A-phase pulse) and the other pulse signal whose phase is shifted from that of the A-phase pulse (hereinafter, this pulse signal is referred to as a B-phase signal), is generated by the second pulse pattern 152 and the second contact brush 156.

Thus, a direction of rotation of the DC motor 110 (the output shaft 127) is detected depending on which of the A-phase pulse and the B-phase pulse is first input to the CPU 240A through the pulse signal detection circuit 220.

Figure 8:
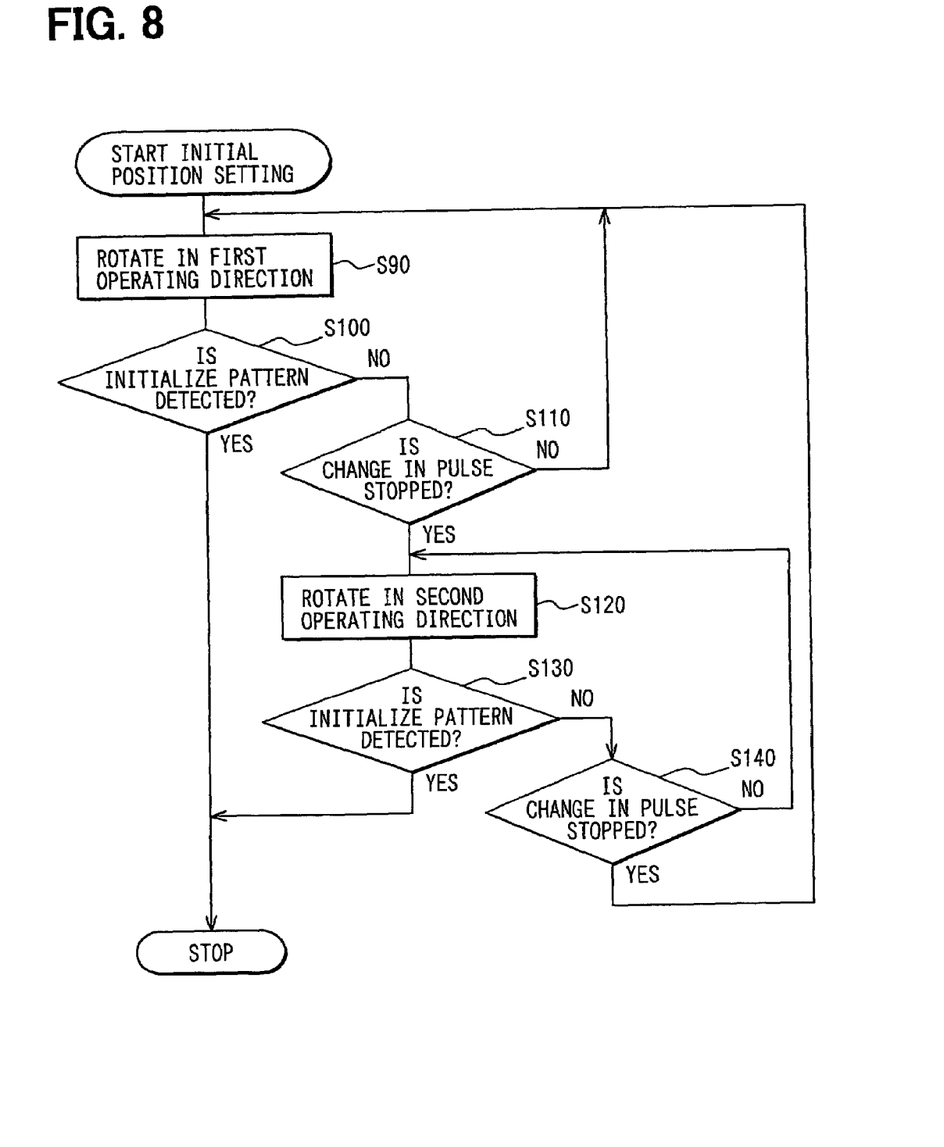
FIG. 8 is a flowchart of control of the electric actuator according to the first embodiment of the present invention.

Next, the operation of this embodiment will be described with reference to FIGS. 8 and 9. FIG. 8 is a flowchart of an initial position setting process of the DC motor 110. For example, when it is determined that an ignition switch (acting as a starting approval switch for allowing the electric power to be supplied to the DC motor 110) is switched ON for the first time after the connection of the battery, based on a flag stored in the memory circuit 230, the CPU 240A starts executing a computer program in accordance with the flowchart of FIG. 8.

First, the DC motor 110 is rotated in a first operating direction by the motor driving circuit 210 (step S90). Then, if the pulse signal in the initialization pattern is detected through the pulse signal detection circuit 220, it is determined to be YES at step S100 so as to perform the initial position setting.

If a pulse signal in the initialization pattern is not detected through the pulse signal detection circuit 220, it is determined to be NO at step S100. Thereafter, it is determined whether a change in amplitude of each of the A-phase pulse signal and the B-phase pulse signal that are input through the pulse signal detection circuit 220 is stopped or not (step S110).

At this step, if an amplitude of any one of the A-phase pulse signal and the B-phase pulse signal that are input through the pulse signal detection circuit 220 is constant over a certain period of time, it is determined that a change in amplitude of each of the A-phase pulse signal and the B-phase pulse signal is stopped. Therefore, it is determined that the lever 160 strikes against the stopper 5b of the pair of stoppers 5a and 5b.

Figure 9:
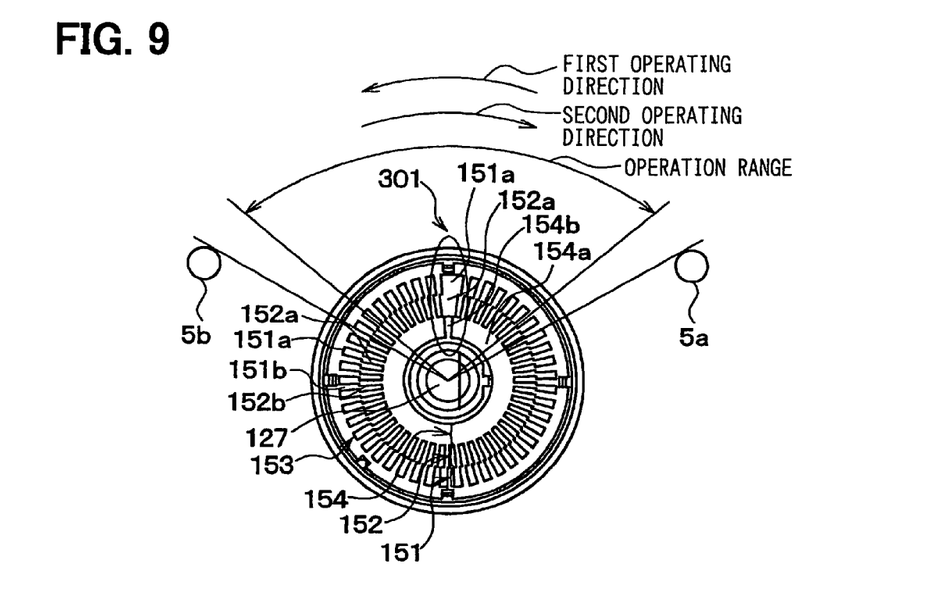
FIG. 9 is an enlarged view of a pulse pattern plate according to the first embodiment.

At this time, it is determined that it is impossible to detect the pulse signal in the initialization pattern, so that the DC motor 110 is rotated in a second operating direction (a direction opposite to the first operating direction) by the motor driving circuit 210 (step S120) (see FIG. 9).

Then, if the pulse signal in the initialization pattern is detected through the pulse signal detection circuit 220, it is determined to be YES at step S130 so as to perform the initial position setting. Even if it is determined to be NO at step S130 because the pulse signal in the initialization pattern cannot be detected, the second operating direction rotation process (step S120), the initialization pattern detection determination process (step S130), and the pulse change determination process (step S140) are repeated unless a change in amplitude of each of the A-phase pulse signal and the B-phase pulse signal is stopped.

Thereafter, if it is determined to be NO at step S130 because the pulse signal in the initialization pattern cannot be detected due to, for example, the presence of a foreign substance, and in addition, a change in amplitude of each of the A-phase pulse signal and the B-phase pulse signal is stopped, it is determined to be YES at step S140 because it is considered that the lever 160 strikes against the other stopper 5a. In this case, since the procedure returns to the first operating direction rotation process (step S90), the DC motor 110 is rotated in the first operating direction again so as to attempt the detection of the pulse signal in the initialization pattern (the detection of the position of the origin).

In the process as described above, after the execution of the initial position setting, the DC motor 110 is controlled so that the air mix door 1 is opened at the target position (at the target angle of rotation) based on the A-phase and B-phase pulse signals input through the pulse signal detection circuit 220.

Next, the effects of this embodiment will be described. In this embodiment, the DC motor 110 and the pulse generator 158 for generating a pulse signal in accordance with the rotation of the DC motor 110 are provided. The CPU 240A detects the pulse signal generated from the pulse generator 158 through the pulse signal detection circuit 220, detects an angle of rotation of the output shaft (rotating shaft) 127 based on the detected pulse signal, and in addition, controls the angle of rotation of the output shaft based on the detected angle of rotation.

In this case, the pulse generator 158 generates the pulse signal in the initialization pattern which indicates the position of the origin of the angle of rotation in accordance with the rotation of the DC motor 110. If the CPU 240A determines that it is impossible to detect the pulse signal in the initialization pattern when the DC motor 110 is rotated in one direction, the DC motor 110 is rotated in the other direction.

As a result, if the DC motor 110 is rotated in the other direction, the detection of the pulse signal in the initialization pattern can be ensured regardless of the position where the DC motor 110 is stopped. With the ensured detection, it can also be ensured that the position of the origin is detected regardless of the position where the DC motor 110 is stopped so as to ensure the completion of the initial position setting.

In this embodiment, the DC motor 110 is stopped by using the stoppers 5a, 5b at the positions out of the operation range, on both sides of the operation range. If the pulse signal in the initialization pattern cannot be detected even when the DC motor 110 is rotated in the first operating direction, the DC motor 110 is rotated in the second operating direction. Even if the pulse signal in the initialization pattern cannot be detected nonetheless, the DC motor 110 is rotated in the first operating direction again so as to attempt the detection of the pulse signal in the initialization pattern.

As described above, even if the pulse signal in the initialization pattern is not generated so that the detection of the pulse signal fails for some reason, such as the presence of a foreign substance when the DC motor 110 is rotated in the second operating direction, the DC motor 110 is rotated in the first operating direction again so as to attempt the detection of the pulse signal in the initialization pattern. As a result, the origin position setting, in turn, the initial position setting, can be further ensured.

(Second Embodiment)

In the above first embodiment, the impossibility of detection of the pulse signal in the initialization pattern is determined based on the determination whether the lever 160 strikes against any one of the stoppers 5a, 5b or not. In the second embodiment, however, the impossibility of detection of the pulse signal in the initialization pattern is determined without using the stoppers 5a, 5b. In this case, the CPU 240A executes the initial position setting process as described below. Moreover, the CPU 240A starts executing a computer program in accordance with FIG. 10 in place of FIG. 8.

Figure 10:
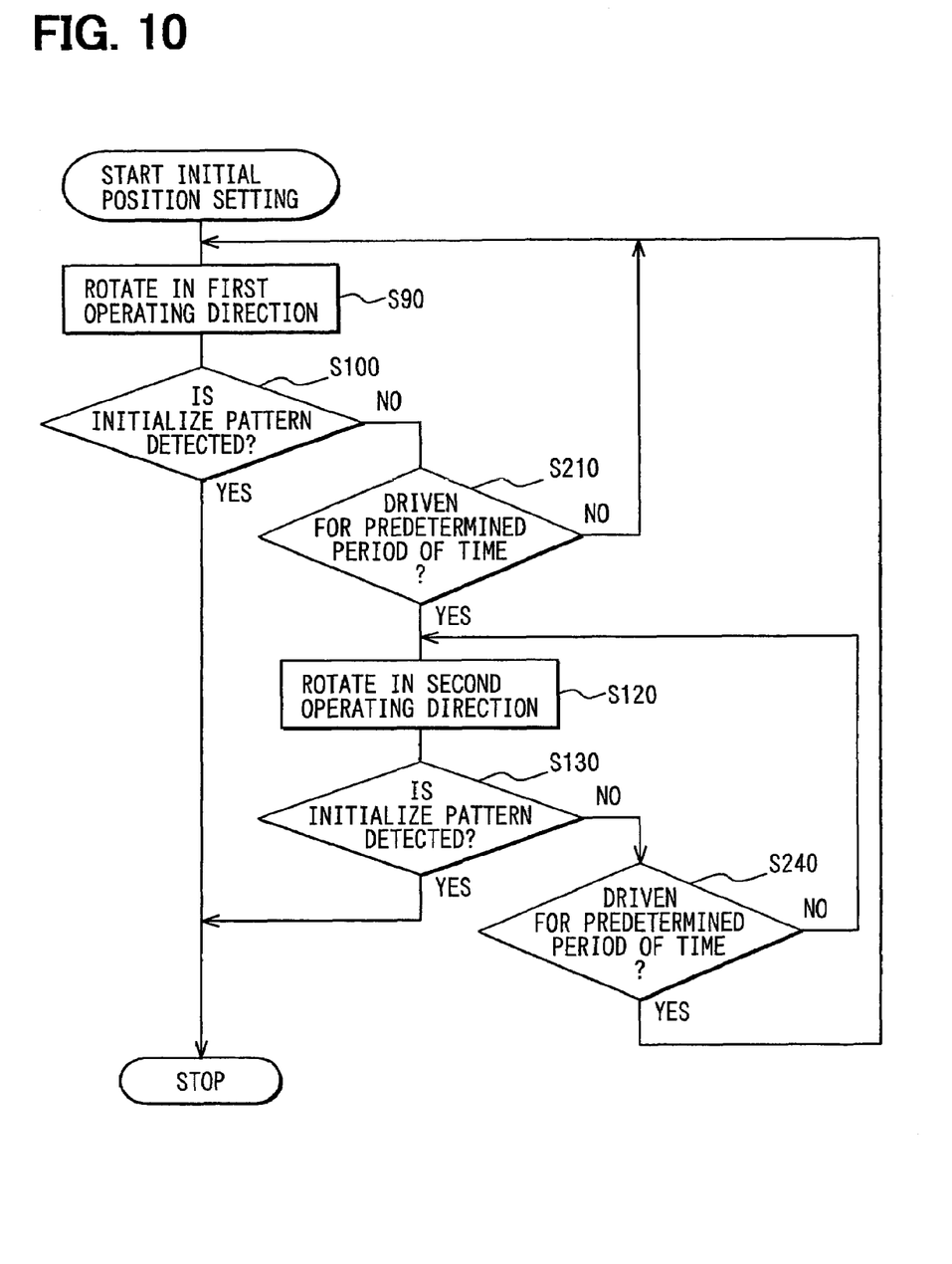
FIG. 10 is a flowchart of control of an electric actuator according to a second embodiment of the present invention.

More specifically, the DC motor 110 is rotated in the first operating direction by the motor driving circuit 210 (step S90). If the pulse signal in the initialization pattern cannot be detected through the pulse signal detection circuit 220 over a predetermined period of time, it is determined that it is impossible to detect the pulse signal in the initialization pattern (step S210). As a result, the DC motor 110 is rotated in the second operating direction by the motor driving circuit 210 (step S120). Thereafter, if the pulse signal in the initialization pattern is detected through the pulse signal detection circuit 220 within a predetermined period of time, it is determined to be YES at step S130 so as to perform the initial position setting.

If the pulse signal in the initialization pattern is not generated within a predetermined period of time for some reason, such as the presence of a foreign substance, after the rotation of the DC motor 110 in the second operating direction, so that the detection of the pulse signal in the initialization pattern fails, the procedure returns to the first operating direction rotation process (step S90). Therefore, at this step, as in the above-described first embodiment, the DC motor 110 is rotated in the first operating direction again so as to attempt the detection of the pulse signal in the initialization pattern (the detection of the position of the origin). The same reference numerals in FIG. 10, as those of FIG. 8, denote the same processes.

As described above, according to the second embodiment, it is possible to determine whether it is impossible to detect the pulse signal in the initialization pattern without using the stoppers 5a, 5b so as to perform the origin position setting, and in turn, the initial position setting. In this case, the link mechanism for linking the electric actuator 100 and the air mix door 1 with each other has an increased degree of freedom because it is no longer necessary to provide the stoppers 5a, 5b.

(Third Embodiment)

Figure 11:
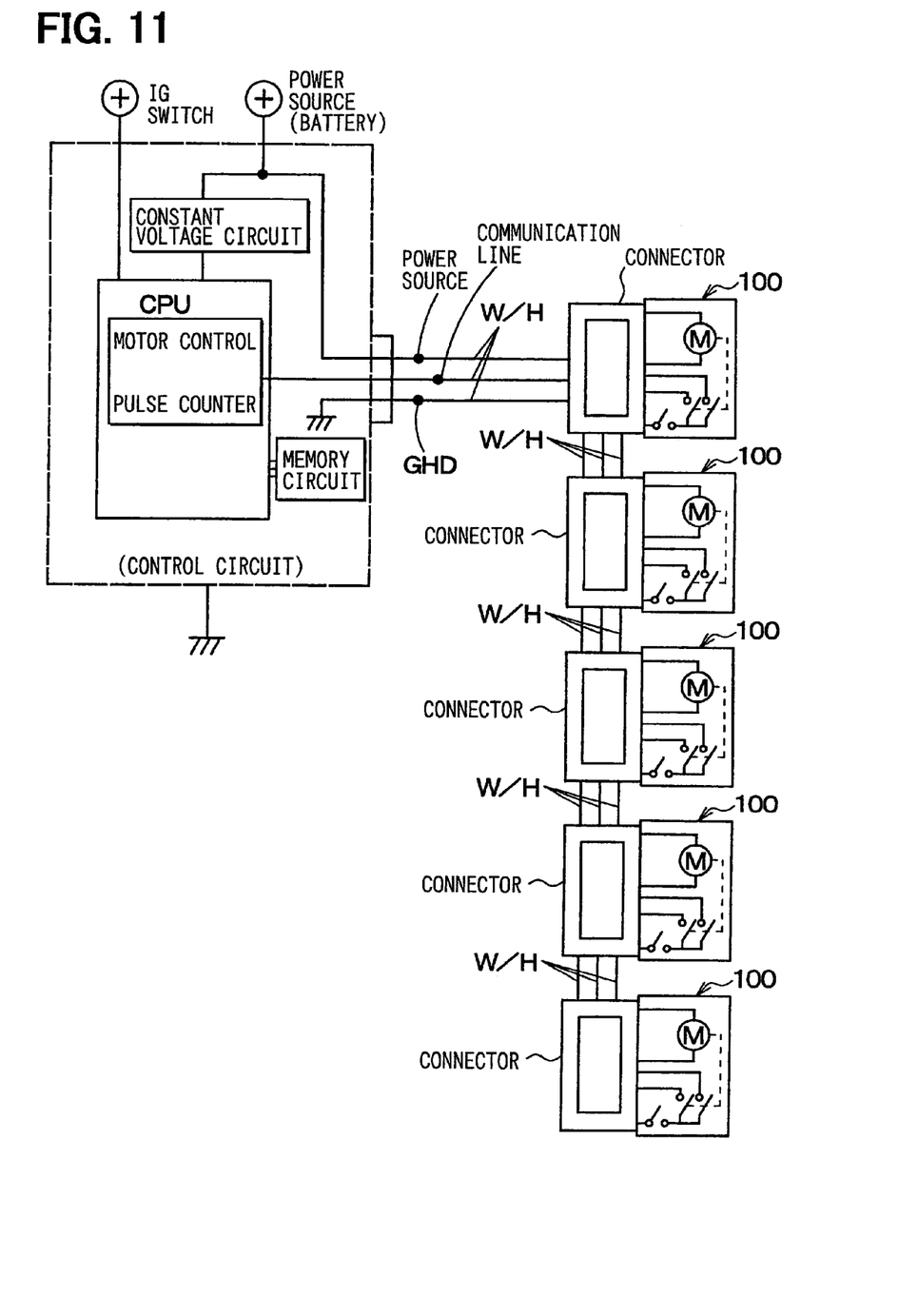
FIG. 11 is a schematic view of an electric actuator system according to the third embodiment of the present invention.

In this embodiment, as shown in FIG. 11, teachings of the present invention are applied to an electric actuator system in which a plurality of the electric actuators 100 and the control device are connected by a network through data communication so as to reduce the number of electric wirings.

On a communication line, a data signal for controlling the plurality of electric actuators 100 in accordance with a procedure defined by a predetermined protocol and a data signal related to a pulse number are transmitted and received between a CPU and each of the electric actuators 100. The plurality of electric actuators 100 operate based on the data signal transmitted through the communication line.

(Fourth Embodiment)

The stoppers 5a, 5b are provided for the air conditioning system casing 5 in the above described first embodiment. However, the provision of the stoppers 5a, 5b is not limited thereto. In this fourth embodiment, two projecting portions may be provided for the casing 140 of the electric actuator 100 as the stoppers 5a, 5b.

Alternatively, a pair of projecting portions may be provided for an output gear within the electric actuator 100 as the stoppers 5a, 5b. Furthermore, the stoppers 5a, 5b for stopping the DC motor 110 may be provided for a driven link connected to the link lever 160 or for the air mix door 1.

(Other Embodiments)

In the above-described first embodiment, when the CPU 240 determines that the ignition switch is switched ON for the first time after the connection of the battery, the CPU 240 executes the initial position setting process. However, the timing of execution of the initialization position setting process is not limited thereto. The initial position setting process may be executed when a pulse problem, such as pulse skipping, occurs in any one of the A-phase pulse signal and the B-phase pulse signal.

For example, as a result of determination whether the A-phase and the B-phase pulse signals are regularly generated or not, if it is determined that any one of the A-phase and the B-phase pulse signals is not regularly generated, it is determined that a pulse problem occurs. Thereafter, when it is determined that the ignition switch is switched ON, the initial position setting process is executed.

In the above-described first embodiment, the rotation of the DC motor 110 is electrically regulated so as to store the position where the DC motor is stopped as the position of the origin. Thereafter, the position shifted from the position of the origin is used as an operation standard so as to control the DC motor 110. However, the operation standard in the present invention is not limited thereto; for example, the position of the origin itself may be used as the operation standard.

Although the teachings of the present invention were described using the sliding contact system position detection device as an example in the above-described first embodiment, the teachings are not limited thereto. The present teachings are also applicable to the other position detection devices such as an optical encoder.

Although the pulse generator 158 is provided for the output shaft 127 in the above-described first embodiment, the teachings of the present invention are not limited thereto. For example, a rotating section whose speed is further reduced may be provided for the pulse generator 158 (the pulse plate 153) so as to generate a pulse signal.

Although the common pattern (the common conductive part pattern) 154 is provided on the inner circumference side of the pulse patterns 151 and 152 in the above-described first embodiment, the present teachings are not limited thereto. The common pattern 154 may be provided on the outer circumference side of the pulse patterns 151 and 152 or may be provided between the pulse patterns 151 and 152. Although the two stoppers 5a and 5b are provided in the above-described embodiments, only one stopper may be provided instead.

Although the teachings of the present invention are applied to a vehicular air conditioning system in the above-described embodiments, the application of the teachings is not limited thereto. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric actuator system for rotating an electric actuator to a position of an origin of an angle of rotation to perform origin position setting for storing rotation to the position of the origin, comprising:
   an electric motor;
   a pulse generator section for generating, while the electric motor is, rotating, (i) a first pulse signal having a given pattern in accordance with the rotation of the electric motor and (ii) a second pulse signal having an initialization pattern in accordance with the rotation of the electric motor, wherein the second pulse signal is different from the given pattern of the first pulse signal and indicates reaching the position of the origin;
   control means for detecting an angle of rotation of a rotating shaft based on the first pulse signal generated from the pulse generator section and for controlling the angle of rotation of the rotating shaft at least over a control range of the angle of rotation based on the detected angle of rotation;
   determination means for determining whether it is impossible or not, to detect the second pulse signal when the electric motor is rotated to a first direction; and
   reversing means for rotating the electric motor to a second direction opposite to the first direction to attempt detection of the second pulse signal when the determination means determines that it is impossible to detect the second pulse signal.

2. The electric actuator system according to claim 1, further comprising:
   a plurality of stopper parts for mechanically stopping the electric motor,
   wherein the determination means determines whether the electric motor is stopped by the stopper parts based on the first pulse signal generated from the pulse generator section to determine whether it is impossible to detect the second pulse signal.

3. The electric actuator system according to claim 2, wherein
   the stopper parts are arranged to stop the electric motor at a position out of the control range of the angle of rotation.

4. The electric actuator system according to claim 3, wherein
   the stopper parts are arranged to stop the electric motor at positions in the first direction and the second direction of the control range of the angle of rotation.

5. The electric actuator system according to claim 1, wherein the determination means determines that it is impossible to detect the second pulse signal when the second pulse signal cannot be detected even after the electric motor is rotated in the first direction for a predetermined period of time.

6. The electric actuator system according to claim 1, wherein the pulse generator section includes a pulse pattern plate that rotates cooperatively with the rotation of the electric motor, the pulse pattern plate comprising:
   a first pulse pattern, a second pulse pattern and
a common pattern,
the first pulse pattern comprising:
a conductive part and a non-conductive part alternately arranged in a circumferential direction, the second pulse pattern comprising:
a conductive part and a non-conductive part alternately arranged in the circumferential direction, and the common pattern comprising:
a conductive part and a non-conductive part arranged in the circumferential direction, the plurality of conductive parts being electrically connected to each other; and
the electric actuator system further comprising:
a first contact brush and a second contact brush connected to one electrode side of a power source, and a third contact brush connected to the other electrode side so as to be formed in contact with the common pattern.

7. The electric actuator system according to claim 6, wherein the initialization pattern is not such that amplitudes of two-phase pulse signals are alternately changed but such that the two-phase pulse signals are simultaneously switched from a first level signal (00) to a second level signal (11) and simultaneously switched from the second level signal to the first level signal.

8. The electric actuator system according to claim 7, wherein,
in an initialization pattern generation state where each of the brushes is in contact with an initialization area being at the position of the origin, the third contact brush and the common pattern transit from a conducting state where the third contact brush and the conductive part of the common pattern are in contact with each other, through a non-conductive state where the third contact brush and the non-conductive part of the common pattern are in contact with each other, to the conducting state again where the third contact brush and the conductive part are in contact with each other, while keeping a conductive state in which the first and second contact brushes and the conductive parts of the first and second pulse patterns are in contact with each other, respectively; and
in the state where each of the brushes is in contact with the initialization area, the system provides the initialization pattern in which the third contact brush on the other electrode side and the common pattern transit from the first level signal at which the third contact brush and the conductive part of the common pattern are in contact with each other, through the second level signal at which the third contact brush and the non-conductive part of the common pattern are in contact with each other, again to the first level signal at which the third contact brush and the conductive part are in contact with each other, while keeping the second level signal at which the first and second contact brushes on the one electrode side and the conductive parts of the first and second pulse patterns are in contact with each other, respectively.

9. The electric actuator system according to claim 6, wherein, in the initialization area and an area on a forward rotation side of the initialization area within an operation range of the pulse pattern plate based on a rotation range of the electric motor, if the first to third contact brushes stop in a contact state, an area where the origin position setting is impossible is generated on the forward rotation side.

10. The electric actuator system according to claim 1, wherein the electric motor is one for driving a movable member including a link mechanism by the rotation of an output shaft of the electric motor.

11. The electric actuator system according to claim 10, wherein the movable member comprises a door for controlling airflow of an air conditioning system.

12. The electric actuator system according to claim 2, wherein the determination means determines that the electric motor is stopped by the stopper parts when an amplitude of the first pulse signal is constant over a predetermined period of time.

13. The electric actuator system according to claim 1, wherein, if it is determined that it is impossible to detect the second pulse signal, and upon reversing the electric motor to the second direction the electric motor is stopped by the stopper, the reversing means rotates the electric motor to the first direction again so as to attempt detection of the second pulse signal.

* * * * *